United States Patent [19]

Hoffman, Jr.

[11] 4,445,594

[45] May 1, 1984

[54] DISC BRAKE NOISE REDUCTION

[75] Inventor: Charles T. Hoffman, Jr., Waynesville, Ohio

[73] Assignee: General Motors Corporation, Detroit, Mich.

[21] Appl. No.: 316,636

[22] Filed: Oct. 30, 1981

[51] Int. Cl.³ .................................... F16D 65/02
[52] U.S. Cl. .................................. 188/73.37; 188/234; 403/197; 411/502; 411/542; 411/544
[58] Field of Search ............... 188/73.36, 73.37, 73.38, 188/73.1, 234, 250 R, 250 B, 250 G; 411/57, 501, 502, 503, 531, 542, 544; 403/194, 197; 16/108

[56] References Cited

U.S. PATENT DOCUMENTS

| 1,950,977 | 3/1934 | Evans | 188/234 |
| 2,697,873 | 12/1954 | Cooke, Jr. | 411/531 X |
| 3,099,057 | 7/1963 | Cook | 411/501 |
| 3,101,205 | 8/1963 | Benham | 403/197 X |
| 3,198,294 | 8/1965 | Stacy | 188/234 |
| 3,385,158 | 5/1968 | Norin | 411/57 |
| 4,055,238 | 10/1977 | Haraikawa et al. | 188/73.37 |

FOREIGN PATENT DOCUMENTS 569951 11/1957 Italy .................................. 188/234

Primary Examiner—George E. A. Halvosa
Attorney, Agent, or Firm—D. D. McGraw

[57] ABSTRACT

A disc brake pad assembly has clench tabs extending through rubber-like grommets in openings in a caliper housing leg so that the grommets are retained in the openings and the brake pad assembly is retained on the housing leg. The grommets provide a noise dampening action during braking to reduce brake noise.

2 Claims, 3 Drawing Figures

DISC BRAKE NOISE REDUCTION

The invention relates to an arrangement for reducing noise generated in a disc brake caliper assembly during braking, and more particularly to an arrangement wherein rubber-like noise dampening grommets and brake shoe clench tabs are extended through openings in a leg of the caliper housing. The clench tabs are clenched tightly on the grommets and the caliper leg, trapping the grommets in position and retaining the brake pad assembly tightly on the caliper leg. The grommets provide a noise dampening action during braking to reduce brake noise.

IN THE DRAWING

Figure 1:
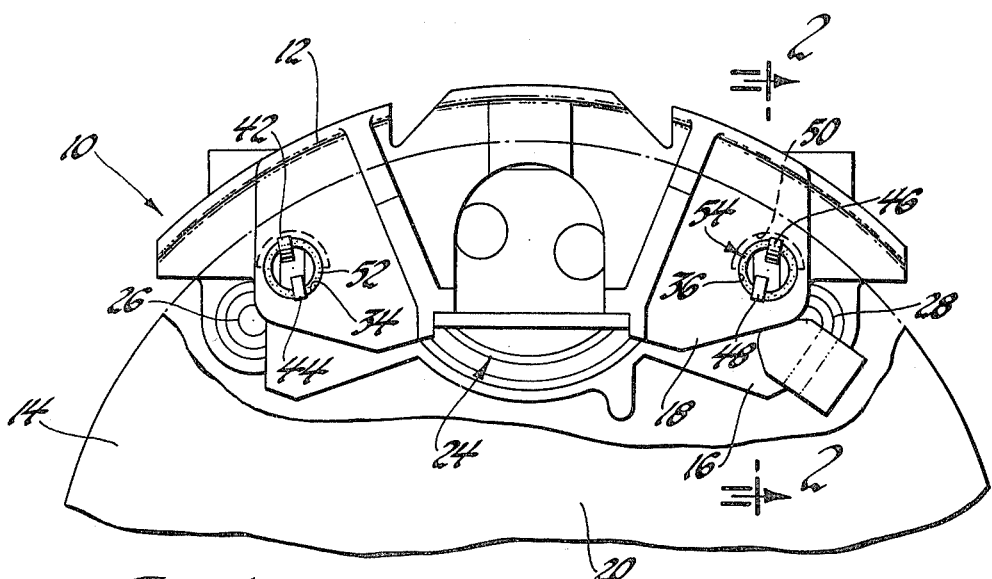
FIG. 1 is an elevation view with parts broken away and showing a brake caliper assembly embodying the invention.

The disc brake caliper assembly 10 is illustrated as including a caliper housing 12 extending over the outer periphery of brake disc 14. Housing 12 has legs 16 and 18 extending along sides 20 and 22 of disc 14. Leg 16 has a brake actuating piston assembly 24. The caliper housing is suitably mounted on mounting bolts 26 and 28 for slidable movement upon braking actuaction, as is well known in the art. Caliper assembly 10 has an inboard brake pad assembly 30 associated with housing leg 16 and piston assembly 24 so as to be moveable to frictionally engage side 20 of disc 14 upon brake actuation. An outboard brake pad assembly 32 is associated with housing leg 18 so that, upon brake actuation and sliding movement of caliper housing 12, the brake pad assembly 32 frictionally engages side 22 of disc 14.

Housing leg 18 is provided with a plurality of openings 34 and 36 extending through the leg and axially parallel to the axis of rotation of disc 14. Two such openings are illustrated and are sufficient for the purpose of practicing the invention. The brake pad assembly 32 has a brake shoe 38 and a brake lining 40. Shoe clench tabs are formed on brake shoe 38 in matching relation with openings 34 and 36. Clench tabs 42 and 44 are illustrated as being associated with opening 34, and clench tabs 46 and 48 are illustrated as being associated with opening 36. The clench tabs may be struck from the shoe 38, or may be otherwise suitably provided.

Figure 2:
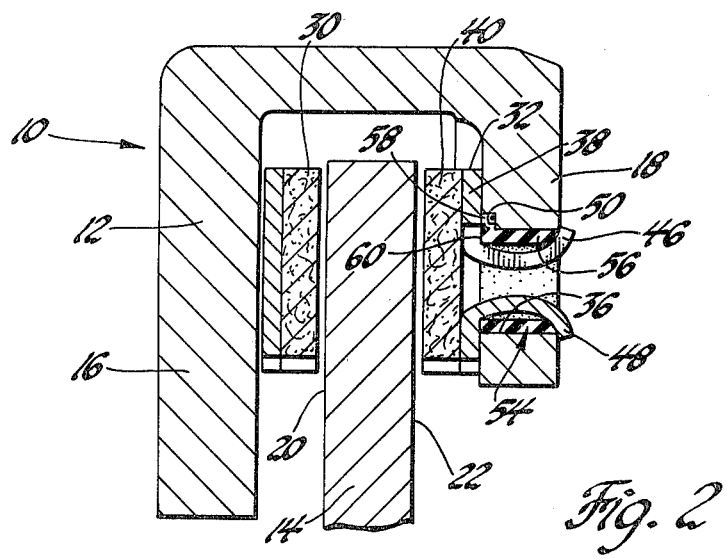
FIG. 2 is a cross section view taken in the direction of arrows 2—2 of FIG. 1 and having parts broken away.

Openings 34 and 36 each have a recess formed at the end thereof adjacent the brake pad assembly 32. FIG. 2 clearly illustrates one such recess 50. The recess may be arcuate as shown in FIG. 1, should clearance of other projections on the caliper leg so dictate. If no clearance problems are involved, the recess may be circumferential.

Figure 3:
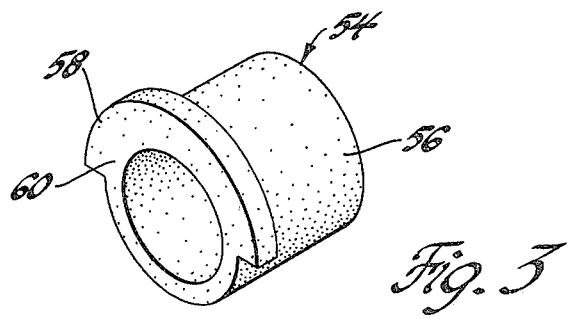
FIG. 3 is a perspective view of a dampening grommet of the type used in the caliper assembly shown in FIGS. 1 and 2.

Grommets 52 and 54 are respectively received in openings 34 and 36. Grommet 54 is shown in greater detail in FIGS. 2 and 3, and is more particularly described below. It is understood that grommet 52 is similarly constructed and installed.

Grommet 54 provides the requisite dampening actuation. It is made of a suitable rubber-like material of a suitable hardness. For example, it may be made of a synthetic rubber of about 80 durometer. It has a resilient cylindrical body 56, one end of which is provided with a flange 58. This flange sits within recess 50 and is therefore arcuate, as illustrated, when the recess is articulately formed. The end of grommet 54 on which flange 58 is formed provides an end surface 60. The grommet is inserted in opening 36 before the brake pad assembly 32 is installed. Flange 58 sits in recess 50 so that surface 60 is flush with the inner surface of housing leg 18.

The brake pad assembly 32 is then installed so that clench tabs 42 and 44 extend through opening 34 and grommet 52. Clench tabs 46 and 48 extend through opening 36 and grommet 54. The clench tabs are then clenched tightly on the grommets and the housing leg to retain the brake pad assembly 32 tightly on the leg. The brake shoe traps the grommets in position. The grommets interface their resilient bodies between the brake shoe and the housing leg to provide a noise dampening action during braking to reduce brake noise.

The embodiments of the invention in which an exclusive property or privilege is claimed are defined as follows:

1. In a disc brake caliper assembly, a noise reduction arrangement comprising:
   a caliper leg for mounting a brake pad assembly on one side of a disc to be braked, said leg having a plurality of spaced openings each having an arcuately extending enlarged shoulder recess opening toward the disc;
   a brake pad assembly including a brake shoe having a plurality of clench tabs formed thereon in matching relation with said plurality of spaced openings;
   a plurality of rubber-like grommets respectively received in said openings, each of said grommets having a cylindrical body received through an opening and an arcuately extending flange head fitting in and occupying said arcuately extending shoulder recess and engaging said brake shoe so as to retain each grommet in its opening;
   said shoe clench tabs extending through said openings and said grommets so that said grommet flange heads are axially trapped in said recesses between said leg and said shoe to assure axial and rotational retention of said grommets, said clench tabs being clenched tightly on said grommets and said leg to retain said brake pad assembly tightly on said leg, said grommets only providing a noise dampening action during braking to reduce brake noise.

2. In a disc brake caliper assembly, a noise reduction arrangement comprising:
   a caliper leg for mounting a brake pad assembly on one side of a disc to be braked, said leg having a plurality of spaced openings each having an arcuately extending enlarged shoulder recess opening toward the disc;
   a brake pad assembly including a brake shoe having a plurality of shoe clench tabs formed thereon in matching relation with said plurality of spaced openings;
   a plurality of rubber-like grommets respectively received in said openings, each of said grommets having a resilient body received through an opening and means fitting in and occupying said arcuately extending shoulder recess and engaging said brake shoe so as to retain each grommet in its respective opening against axial and rotational movement;
   said shoe clench tabs extending through their respective openings and said grommet bodies in cooperation with the retaining means and said brake shoe to assure retention of said grommets in said openings, said shoe clench tabs being clenched tightly on the body of their respective grommets in cooperation with said leg to retain said brake pad assembly on said leg, each of said grommets interfacing its resilient body between the brake shoe clench tabs and the leg to only provide a noise dampening action during braking to reduce brake noise.

* * * * *